(12) United States Patent
Liu et al.

(10) Patent No.: US 6,693,762 B2
(45) Date of Patent: Feb. 17, 2004

(54) METHOD AND APPARATUS FOR LOAD/UNLOAD TESTING OF DISK DRIVES

(75) Inventors: Bo Liu, Singapore (SG); Yaolong Zhu, Singapore (SG)

(73) Assignee: Data Storage Institute, Singapore (SG)

( * ) Notice: Subject to any disclaimer, the term of this patent is extended or adjusted under 35 U.S.C. 154(b) by 369 days.

(21) Appl. No.: 09/915,279

(22) Filed: Jul. 27, 2001

(65) Prior Publication Data

US 2002/0027736 A1 Mar. 7, 2002

(30) Foreign Application Priority Data

Aug. 3, 2000 (SG) ............................. 200004354

(51) Int. Cl.[7] .................... G11B 21/02; G11B 15/46
(52) U.S. Cl. ........................... 360/75; 360/73.03
(58) Field of Search ................ 360/75, 73.03, 360/69, 31, 55, 78.01, 78.04

(56) References Cited

U.S. PATENT DOCUMENTS

| | | | |
|---|---|---|---|
| 5,831,786 A | 11/1998 | Boutaghou et al. ........... 360/75 |
| 6,046,877 A | 4/2000 | Kelsic ........................ 360/75 |
| 6,614,614 B1 * | 9/2003 | Murayama et al. ...... 360/77.02 |
| 2003/0002196 * | 1/2003 | Kusumoto et al. ............ 360/75 |

* cited by examiner

*Primary Examiner*—Andrew L. Sniezek
(74) *Attorney, Agent, or Firm*—Dickinson Wright PLLC (57) ABSTRACT

The invention provides an apparatus (10) and method for monitoring the load/unload process of a head-gimbal assembly (HGA) (14), disk (12) and ramp (16) combination. A ramp strain arm (18) is used to monitor the entire load/unload process. The ramp strain arm (18), on which the ramp (16) is mounted, includes force sensors (46,48) that measure the friction force between the HGA (14) and ramp (16) as well as the air-bearing force on the slider (30) of the HGA (14) during the load/unload process. The signals form the force sensors (46,48) are input to a computer (22) through an interface circuit (24) for recording and analysis in order to evaluate the performance of the combination of the HGA (14), disk (12) and ramp (16).

33 Claims, 9 Drawing Sheets

METHOD AND APPARATUS FOR LOAD/ UNLOAD TESTING OF DISK DRIVES

FIELD OF THE INVENTION

The invention relates to monitoring the head-disk interface for disk drives and more particularly concerns the ramp load/unload testing of the magnetic head slider, disk and ramp.

BACKGROUND ART

Disk drives, also referred to as hard disk drives and direct access storage devices, have one or more disks on the surface of which is a thin magnetisable layer. Information is written to and read from the disks using one or more read and/or write heads attached to a slider. The slider is supported on a head gimbal assembly (HGA).

When the disk drive is in operation, the disks are quickly rotating and the slider is spaced from the disk surface by an air-bearing effect due to the disks' rotation. When the disk drive is not in operation, the slider can be parked or brought to rest according to one of two methods. The first method is to rest the slider directly on the disk surface. This method is referred to as a contact start/stop (CSS). The second method is to park the HGA on a ramp provided adjacent the perimeter of the disk in order to keep the slider spaced from the disk surface. This method is referred to as a dynamic load/unload (L/UL).

In disk drives that use the CSS method of parking the slider, when the disk drive is turned off the slider rests on the disk surface. When the disk drive is powered on for operation the slider takes off from the disk surface because of the air-bearing effects induced by the disk rotating. One concern with the CSS method of parking the slider is that stiction (static friction) between the slider and disk surface when the disk drive is powered on results in wear on the disk surface, ultimately producing errors. Further, during manufacture of a disk drive using the CSS method of parking the slider, the head stack assembly (HSA) composed of two or more head gimbal assemblies needs to be loaded to the disk surfaces. This loading operation may also cause damage to the disk surfaces and/or the sliders.

In disk drives utilizing the L/UL method of parking the slider, a parking ramp forms part of the disk drive and is located adjacent to the disk surface. When the disk drive is powered off, the HSA is rotated to a parked position in which a portion of each HGA, called the ramp rider or the lift tab, rests on the ramp above the disk surface. In this state, the slider is spaced from the disk surface. When the disk drive is powered on, the HSA is moved from the parked position off the ramp to place the slider above the disk surface.

Each HGA includes a suspension member that is mounted to an actuator assembly. The suspension member carries the slider at its free end and biases the slider against the disk surface. When the disk rotates, the air-bearing creates a lifting force that counter-balances the bias of the suspension member. When the disk drive is powered off and the ramp rider is parked on the ramp, the suspension member continues to exert a force on the ramp directed toward the disk surface. Under prolonged contact, the loading force from the suspension member contributes to stiction between the ramp rider and the ramp. This stiction can hinder the loading and unloading operation.

Further, during a loading operation, when the HGA is moved from the parked position to the disk surface, the stiction forces can exceed the torque available to move the actuator assembly to which the suspension is coupled. This results in failure of the disk drive.

During a load/unload operation when the HGA is moved from/to the ramp, there is an opportunity for slider disk surface contact to occur which can result in a so-called head crash.

The HGA and the disk are typically tested before being confirmed as components of a hard disk drive. For a CSS tester, the only concern is the slider-disk interaction. For a L/UL tester, there are two concerns: the slider-disk interaction and the HGA-ramp interaction.

Prior L/UL testers include force sensors that measure the friction force between the slider and the disk and an acoustic emission (AE) sensor to monitor the slider-disk interaction. Such L/UL testers can not be used to monitor the entire load/unload process. Accordingly, there is a need for a new load/unload tester that can be used to monitor HGA-ramp interaction and the slider-disk interaction at the same time.

DISCLOSURE OF THE INVENTION

In accordance with a first aspect of this invention, there is provided an apparatus for monitoring a load/unload process in a disk, a ramp and a head-gimbal-assembly (HGA), comprising:

a ramp strain arm comprising a deformable member and force sensing means provided on said deformable member, said ramp being mounted on said deformable member;

an actuator assembly, the HGA being mounted on the actuator assembly, the actuator assembly controlling movement of the HGA to and from a loaded position on the ramp; and control means in communication with the force sensing means to receive signals therefrom representative of the force on the ramp from the HGA.

Preferably, said force sensing means comprises first force sensors arranged to measure the friction force between the HGA, and the ramp, and second force sensors arranged to measure the force which acts on the ramp along a direction perpendicular to the disk's surface.

Preferably, said force sensing means comprises force sensors arranged to measure the friction force between the HGA and the ramp.

Preferably, said force sensing means comprises force sensors arranged to measure the force which acts on the ramp along a direction perpendicular to the disk's surface.

Preferably, the force sensing means further comprises an AE sensor arranged to monitor the interaction between the HGA, the disk and the ramp.

Preferably, said control means is arranged to control operation of a motor that revolves the disk.

Preferably, said control means is arranged to control operation of the actuator assembly for moving the HGA.

In accordance with a second aspect of this invention, there is provided an apparatus for monitoring a load/unload process in at least one disk, a plurality of ramps and a head-stack-assembly comprising a plurality of head-gimbal-assemblies (HGAs), comprising:

a plurality of ramp strain arms, each comprising a deformable member and force sensing means provided on said deformable member, each ramp strain arm having a ramp mounted on its deformable member;

an actuator assembly, the HSA being mounted on the actuator assembly, the actuator assembly controlling movement of the HGAs to and from a loaded position on the ramps; and control means in communication with the force sensing means to receive signals therefrom representative of the force on the corresponding ramp from the corresponding HGA.

Preferably, said force sensing means of each ramp strain arm comprises first force sensors arranged to measure the friction force between the corresponding HGA and the corresponding ramp, and second force sensors arranged to measure the force which acts on the corresponding ramp along a direction perpendicular to the disk's surface.

Preferably, said force sensing means of each ramp strain arm comprises force sensors arranged to measure the friction force between the corresponding HGA and the corresponding ramp.

Preferably, said force sensing means of each ramp strain arm comprises force sensors arranged to measure the force which acts on the corresponding ramp along a direction perpendicular to the disk's surface.

Preferably, the force sensing means further comprises an AE sensor arranged to monitor the interaction between the corresponding HGA, the disk and the corresponding ramp.

Preferably, said control means is arranged to control operation of a motor that revolves the disk.

Preferably, said control means is arranged to control operation of the actuator assembly for moving the HGA.

In accordance with a third aspect of this invention, there is provided a ramp strain arm for monitoring a load/unload process in a disk, a ramp and a head-gimbal-assembly (HGA), comprising a deformable member and force sensing means provided on said deformable member, said ramp being mounted on said deformable member; whereby said force sensing means produce signals representative of the force on the ramp from the HGA.

Preferably, said force sensing means comprises first force sensors arranged to measure the friction force between the HGA and the ramp, and second force sensors arranged to measure the force which acts on the ramp along a direction perpendicular to the disk's surface.

Preferably, said force sensing means comprises force sensors arranged to measure the friction force between the HGA and the ramp.

Preferably, said force sensing means of comprises force sensors arranged to measure the force which acts on the ramp along a direction perpendicular to the disk's surface.

Preferably, the force sensing means further comprises an AE sensor arranged to monitor the interaction between the HGA, the disk and the ramp.

Preferably, the force sensors comprise strain gauges.

Preferably, the force sensors comprise piezo-electrical strain sensor.

In accordance with a fourth aspect of this invention, there is provided a method for monitoring the performance and/or the load/unload process of the combination of a HGA, disk and ramp comprising the steps of:

providing means for supporting said disk for rotation about a central axis extending perpendicular to the substrate plane of disk;

providing a head-disk assembly comprising a slider carrying a read/write element and having an air-bearing surface, suspension and ramp rider;

providing a ramp strain arm having a deformable member and force sensors provided on said deformable member;

mounting the ramp on the deformable member; and recording signals from the force sensors.

Preferably, the method further comprises the steps of:

providing a HGA strain arm comprising a deformable member, force sensors provided on said deformable member and an AE sensor;

mounting said HGA on said deformable member; and recording signals from the force sensors and the AE sensor.

DETAILED DESCRIPTION OF THE PREFERRED EMBODIMENTS

Figure 1:
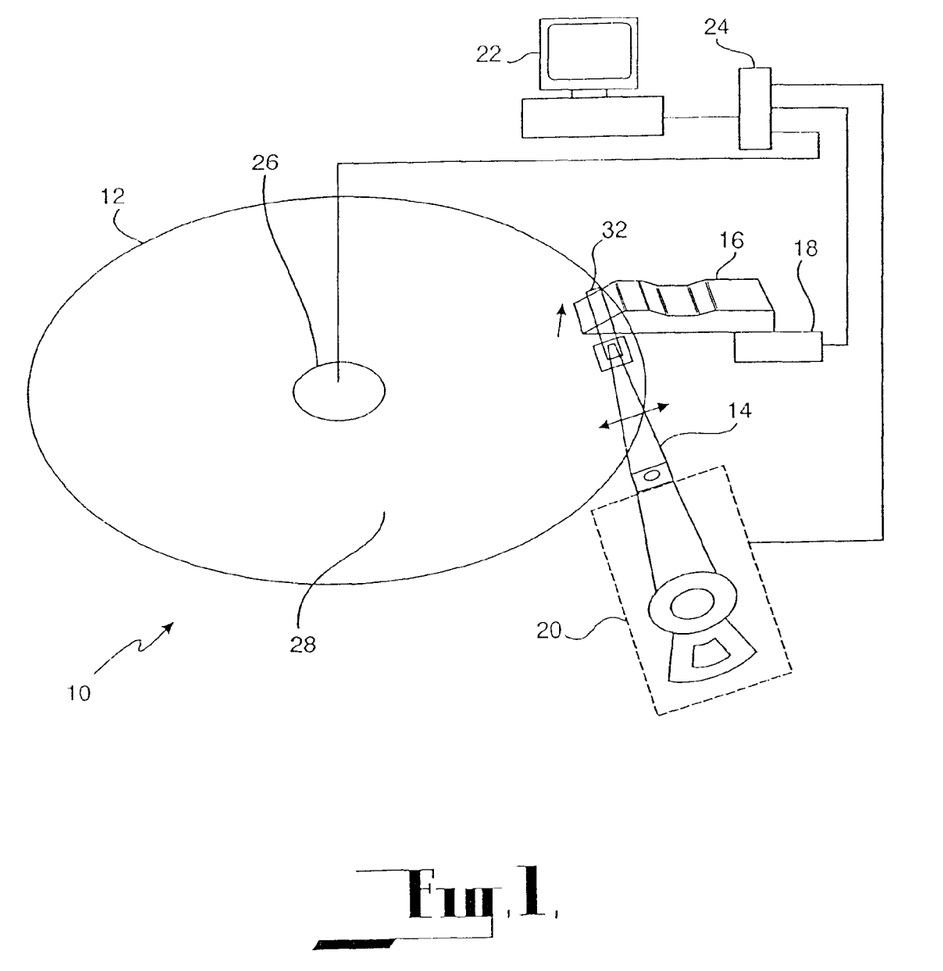
FIG. 1 shows an apparatus for monitoring the load/unload process of a HGA, disk and ramp in accordance with a first embodiment of the invention.

The first embodiment, shown in FIG. 1, is directed towards an apparatus 10 for monitoring the load/unload process of a head-gimbal assembly (HGA) 14, disk 12 and ramp 16.

The apparatus 10 comprises a ramp strain arm 18, an actuator assembly 20 and control means in the form of a computer 22 and interface circuit 24. The electronic circuit 24 comprises an amplifier, an analog-to-digital converter and an interface circuit. The electronic circuit 24 allows the computer 22 to control communicate with devices connected to the electronic circuit 24, as described below.

The actuator assembly 20 is connected to the electronic circuit 24 and is controlled by the computer 22. This allows the computer 22 to relate measurements of the forces during a load or unload process to the position of the actuator assembly 20.

The disk 12 is mounted on a spindle 26 that is coupled to a motor (not shown). The motor (not shown) is controlled by the computer 22 via the interface circuit 24 to rotate the disk 12 at a desired speed.

The ramp 16 is mounted on the ramp strain arm 18. The ramp strain arm 18 is mounted on a conventional motion stage (not shown) that is used to adjust the position of the ramp 16 relative to the surface 28 of the disk 12 and the periphery of the disk 12.

Figure 2:
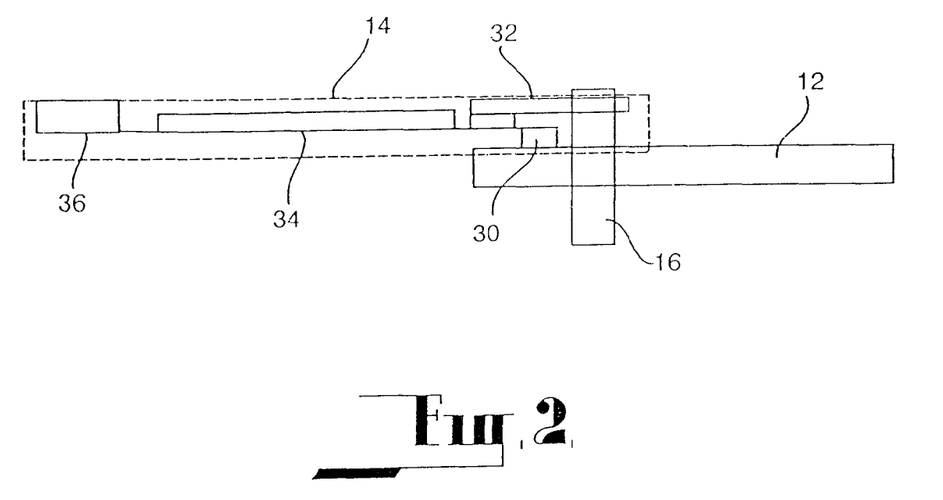
FIG. 2 is a schematic representation of the HGA shown in FIG. 1.

The HGA 14, shown in FIG. 2, comprises a slider 30, a ramp rider 32, a loading beam 34 and a base-plate 36. The HGA 14 is mounted on the actuator assembly 20 that can rotate the HGA 14 to and from a parked position on the ramp 16, and load/unload the HGA 14 to and from the disk surface 28.

Figure 3:
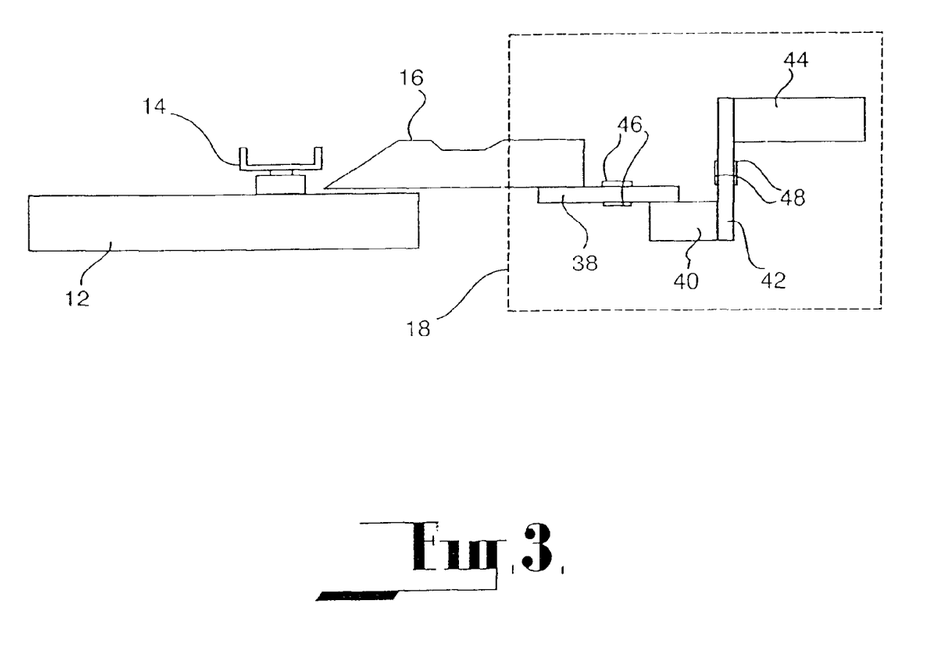
FIG. 3 shows a ramp strain arm used in the apparatus shown in FIG. 1.

The ramp strain arm 18, shown in FIG. 3, comprises a first beam 38 formed from a deformable material such as metal. The first beam 38 is connected to the ramp 16 at one end and to a first bar 40 at the other end thereof, and is oriented substantially parallel with the surface 28 of the disk 12. A second beam 42 formed from a deformable material is connected to the first bar 40 at one end and to a second bar 44 at its other end. The second beam 42 is arranged perpendicular to the surface 28 of the disk 12. The second bar 44 is mounted to the motion stage (not shown).

The ramp strain arm 16 further comprises a pair of first force sensors 46 that are attached to opposing sides of the first beam 38 and a pair of second force sensors 48 that are attached to opposing sides of the second beam 42. The force sensors 46 and 48 are connected to the interface circuit 24 of the computer 22.

Although it is described here that the force sensors 46 and 48 are attached to both sides of the beams 38 and 42 respectively, it should be apparent that there are many other methods for attaching the force sensors to the beams, for example, to attach a single force sensor to one side of each beam. The force sensors 46 and 48 can be of any suitable type, such as strain gauges, piezo-electrical force sensors, and semiconductor force sensors.

Examples of other suitable forms for the ramp strain arm 18 are described below in relation to the second through fourth embodiments shown in FIGS. 4 to 6.

Referring to FIG. 1, when the HGA 14 is in the parked position on the ramp 16 the ramp rider 32 rests on the ramp 16, thereby supporting the slider 30 away from the surface 28 of the disk 12. The ramp rider 32 bears against the ramp 16 under the effect of the loading beam 34, thereby adding to stiction acting between the ramp 16 and the ramp rider 32 in the parked position.

The force acting on the ramp 16 due to the loading beam 34 is measured by the first force sensors 46. The stiction and friction force between the ramp rider 32 and ramp 16 is measured by the second force sensor 48. Signals from the force sensors 46 and 48 are measured and recorded by the computer 22.

During a typical load process in which the HGA 14 moves from the ramp 16 to the disk 12, the loading force acting on the ramp 16 changes according the position of the HGA 14 on the ramp 16. This variation in the loading force can be monitored using the first force sensors 46.

Further, when the HGA 14 is about to leave the ramp 16, the loading force will vary due to the formation of the air-bearing under the air-bearing surface of the slider 30. This variation of the force can be also monitored using the first force sensors 46. Thus, the air-bearing force acting on the slider 30 can be measured. According to the same principle, the friction force between the ramp rider 32 of the HGA 14 and the ramp 16 can be monitored using the second force sensors 48.

In a similar manner, the apparatus 10 can be used to measure forces during the unloading process.

The first embodiment provides an apparatus 10 and method for monitoring the load/unload process of HGA, disk and ramp. A ramp strain arm is used to monitor the entire load/unload process. The ramp strain arm, on which the ramp is mounted, includes force sensors that measure the friction force between the HGA and ramp as well as the air-bearing force on the slider during the load/unload process. The signals form the force sensors are input to a computer through an interface circuit for recording and analysis in order to evaluate the performance of the combination of HGA, disk and ramp.

Figure 4:
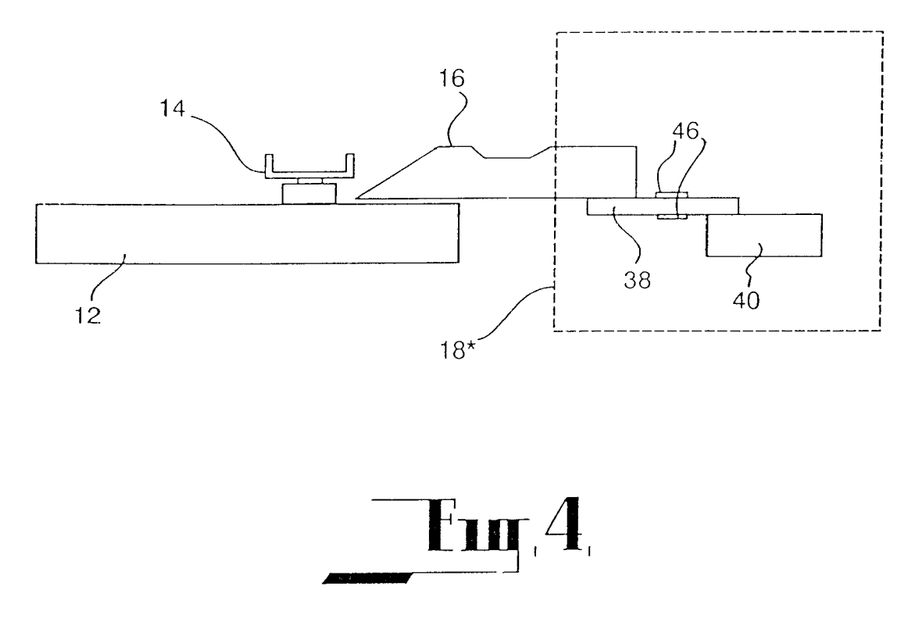
FIG. 4 shows a ramp strain arm in accordance with a second embodiment of the invention, suitable for use in the apparatus shown in FIG. 1.

An alternative, second embodiment of the ramp strain arm is shown in FIG. 4, with like reference numerals denoting like parts to those in the first embodiment. The ramp strain arm 18' of the second embodiment differs from the ramp strain arm 18 of the first embodiment in that it does not include the second beam 42, the second bar 44 or the second sensors 48. The first bar 40 in the second embodiment is mounted to a motion stage (not shown).

Figure 5:
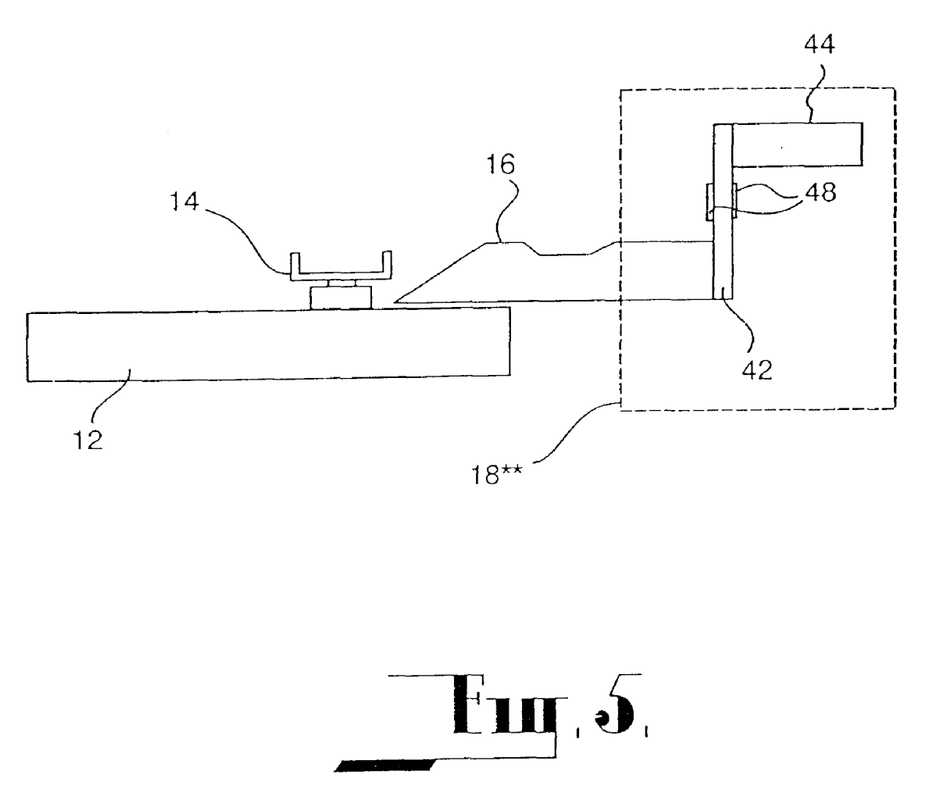
FIG. 5 shows a ramp strain arm in accordance with a third embodiment of the invention, suitable for use in the apparatus shown in FIG. 1.

An alternative, third embodiment of the ramp strain arm is shown in FIG. 5, with like reference numerals denoting like parts to those in the first embodiment. The ramp strain arm 18" of the third embodiment differs from the ramp strain arm 18 of the first embodiment in that is does not include the first beam 38, the first bar 40 or the first sensors 46. The second beam 42 in the second embodiment is mounted to the ramp 16 at one end and the second bar 44 at its other end.

Figure 6:
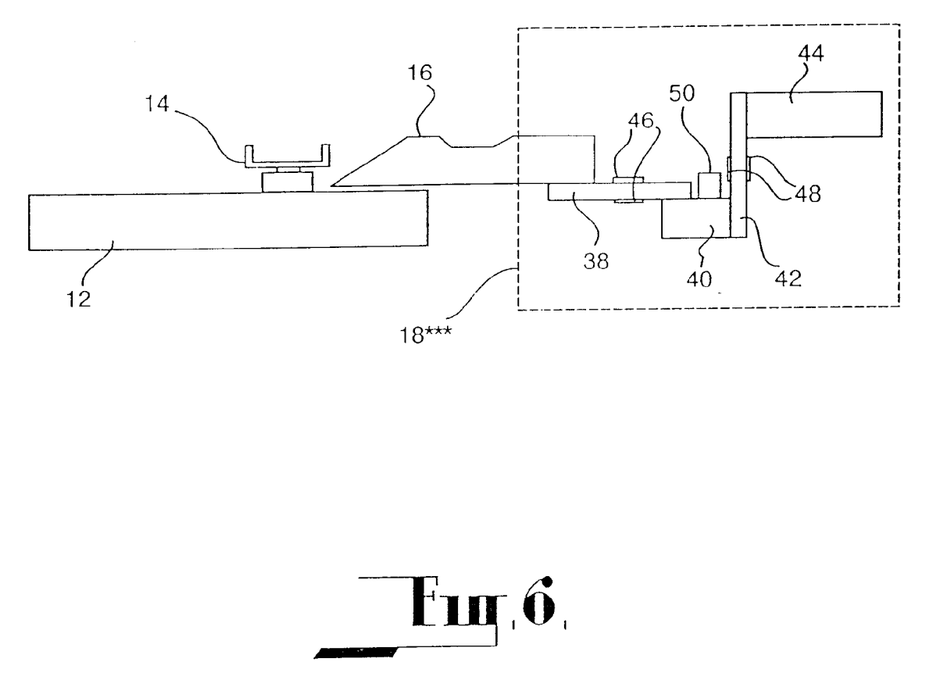
FIG. 6 shows a ramp strain arm in accordance with a fourth embodiment of the invention, suitable for use in the apparatus shown in FIG. 1.

An alternative, fourth embodiment of the ramp strain arm is shown in FIG. 6, with like reference numerals denoting like parts to those in the first embodiment. The ramp strain arm 18''' of the fourth embodiment is of the same form as the ramp strain arm 18 of the first embodiment, however the ramp strain arm 18''' of the fourth embodiment includes an AE sensor 50 provided on the first bar 40. The signal from the AE sensor 50 is connected to the computer 22 via the interface circuit 24.

Figure 7:
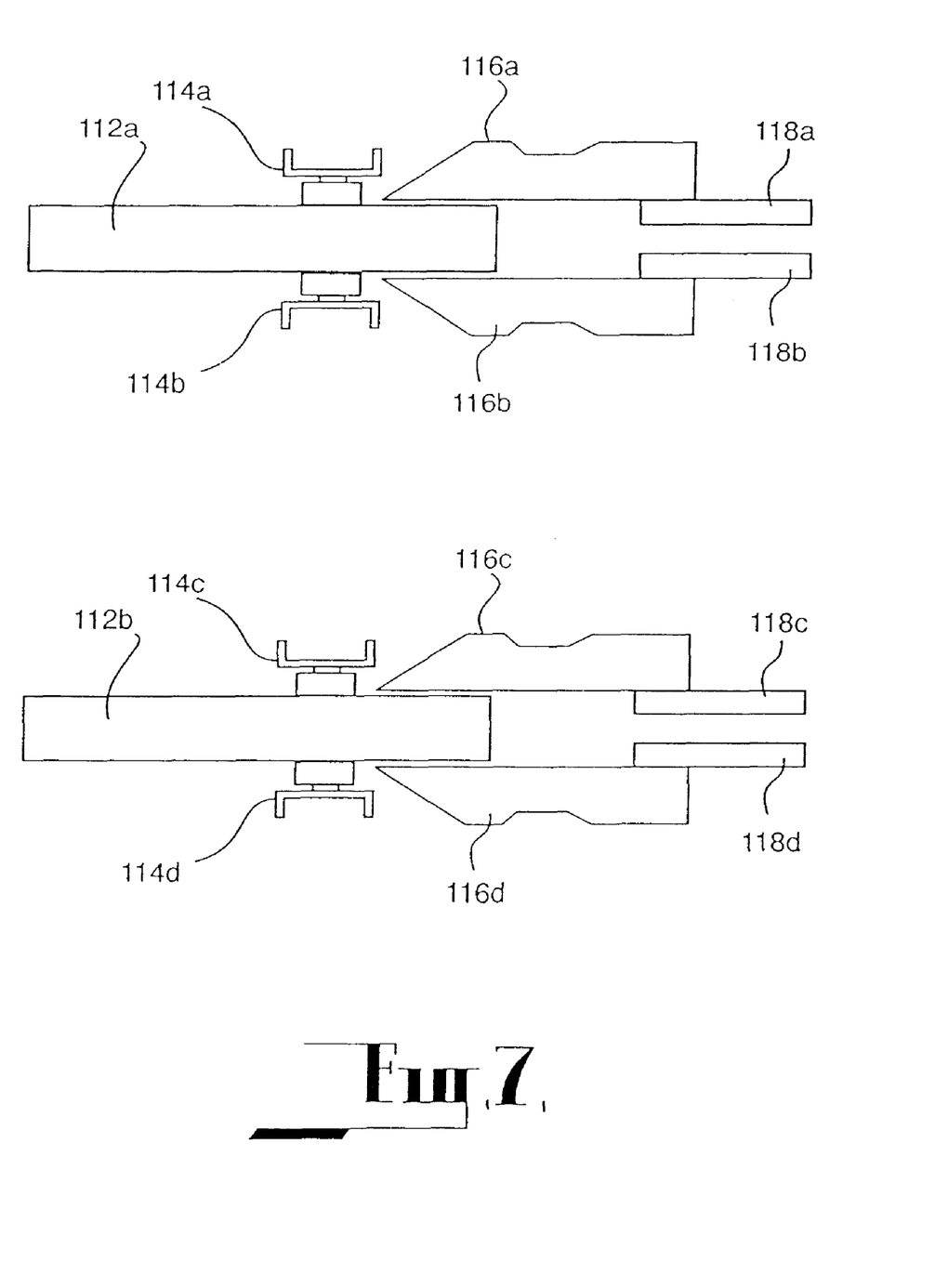
FIG. 7 shows an apparatus for monitoring the load/unload process of a HSA, disks and ramps in accordance with a fifth embodiment of the invention.

The fifth embodiment is directed towards an apparatus 100 for monitoring the load/unload performance of a head-stack assembly (HSA), disks and ramps, as shown in FIG. 7. Like numerals are used to denote like parts to those in the first embodiment, with 100 added thereto.

In this embodiment, two double-sided disks 112a and 112b are provided in a stack. The HSA comprises HGAs 114a to 114d that are mounted on the actuator assembly (not shown). The HGAs 114a–114d are rotated in unison by the actuator assembly (not shown) to and from parked positions on ramps 116a–116d, respectively.

The ramps 116a–116d are mounted on ramp strain arms 118a–118d, respectively. The ramp strain arms 118a–118d can take the form of any one of the ramp strain arms described in FIG. 3–FIG. 6. To provide consistent results, it is preferred that the ramp strain arms 118a–118d are all of the same type.

The ramp strain arms 118a–118d include force sensors, as previously described in relation to the ramp strain arms shown in FIG. 3–FIG. 6, that can be used to measure the air-bearing force and/or the friction force between the corresponding HGA 114a–114d and ramp 116a–116d during the load/unload process. The signals from the ramp strain arms 118a–118d are input into a computer (not shown) and analyzed to evaluate the performance of the combination of the HSA, disks and ramps, in a similar manner to that described in relation to the first embodiment.

Figure 8:
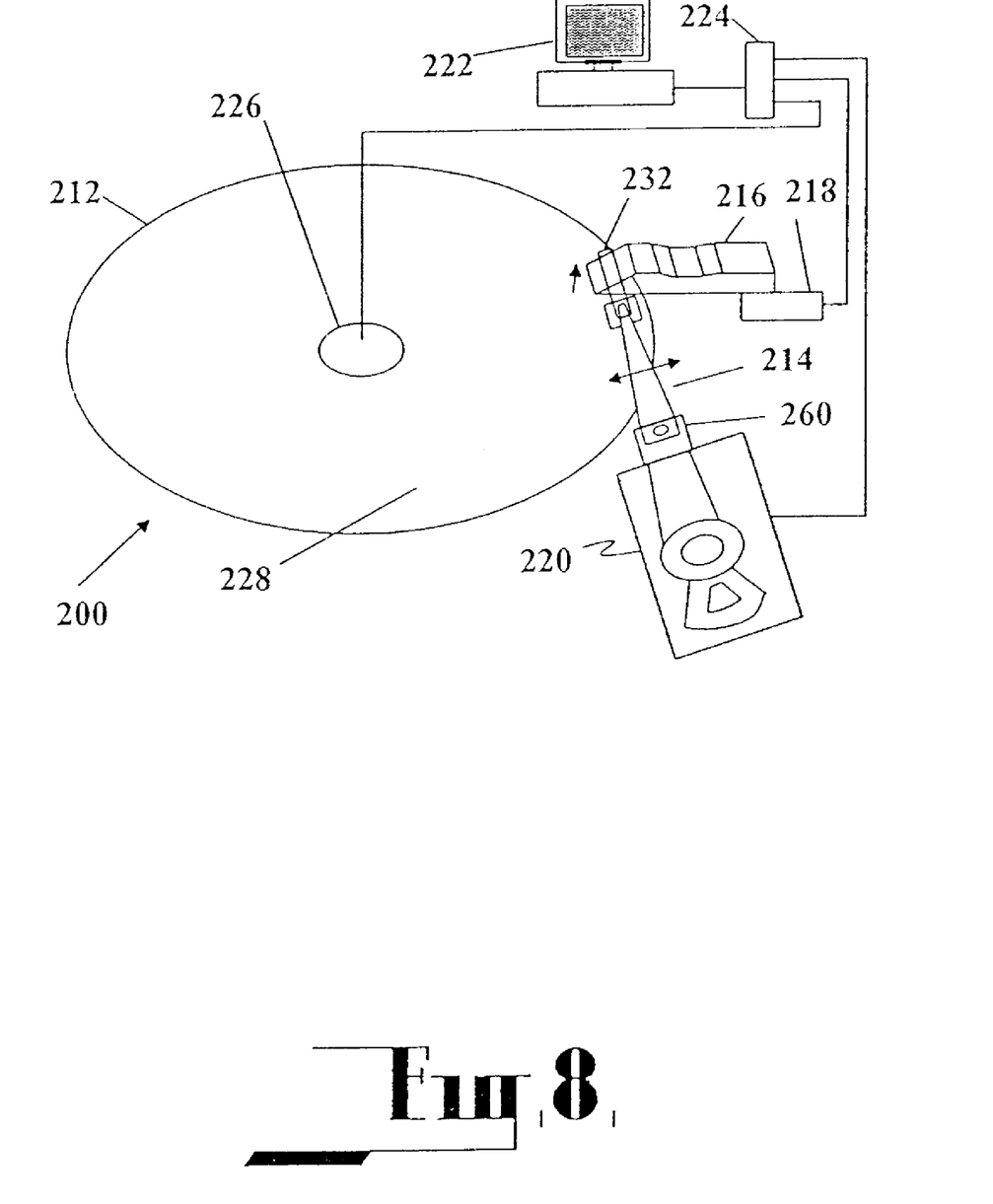
FIG. 8 shows an apparatus for monitoring slider-disk interaction and the load/unload process of a HGA, disks and ramps in accordance with a sixth embodiment of the invention.
Figure 9:
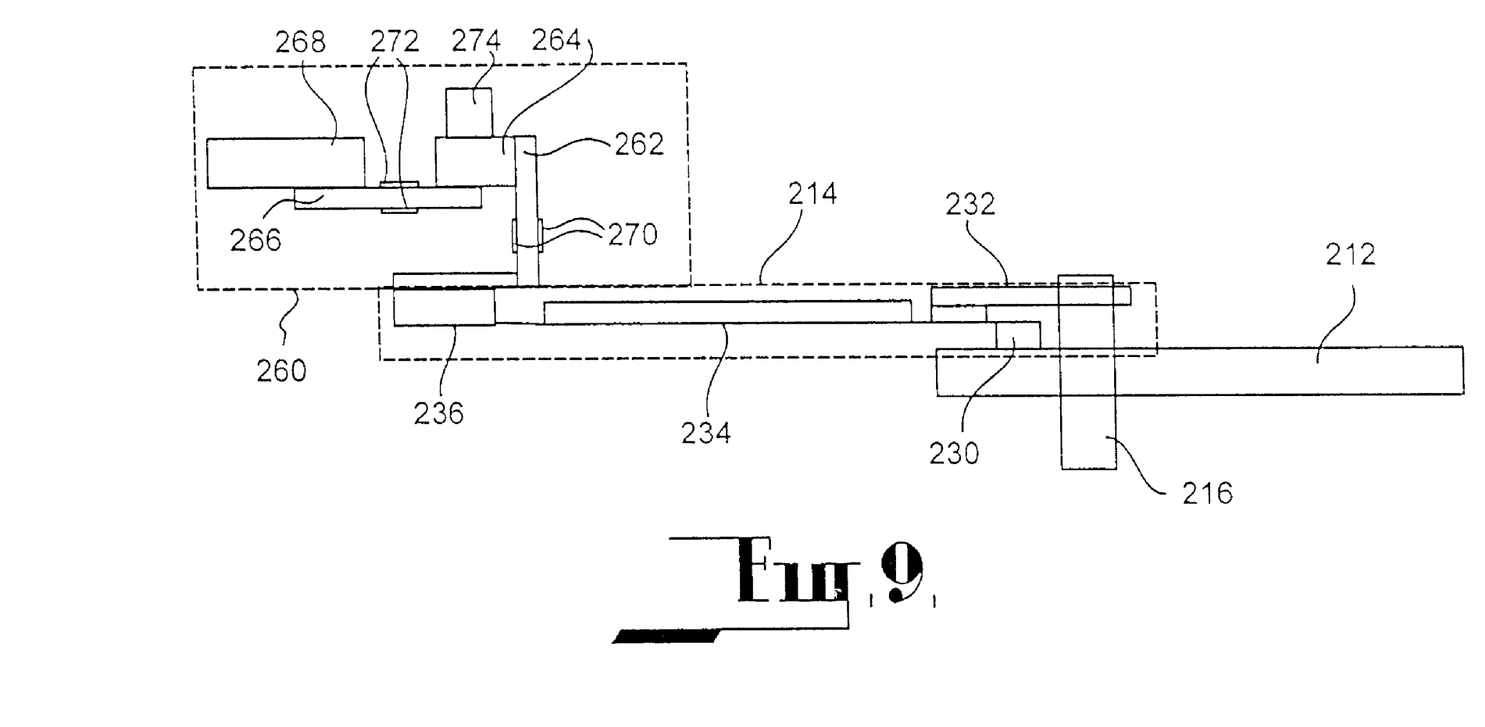
FIG. 9 shows the HGA strain arm of the apparatus shown in FIG. 8.

The sixth embodiment, shown in FIGS. 8 and 9, is directed towards an apparatus 200 for monitoring the load/unload performance of a HGA, disk and ramp. Like numerals are used to denote like parts to those in the first embodiment, with 200 added thereto.

As shown in FIG. 8, this embodiment is of the same form as the first embodiment, with the exception that this embodiment includes a HGA strain arm 260. The HGA 214 is mounted on a HGA strain arm 260. The HGA strain arm 260 is connected to the actuator assembly 220 that can rotate the HGA strain arm 260 and HGA 214 to and from a parked position on the ramp 216.

The HGA strain arm 260 is shown in more detail in FIG. 9. The HGA strain arm 260 comprises a first beam 262 formed from a deformable material such as metal. The first beam 262 is connected to the base plate 236 at one end and to a first bar 264 at the other end thereof, and extends generally perpendicular to the surface 228 of the disk 212. A second beam 266 formed from a deformable material is connected to the first bar 262 at one end and to a second bar 268 at its other end. The second beam 266 is arranged parallel to the surface 228 of the disk 212. The second bar 268 is mounted to the actuator assembly 220.

The HGA strain arm 260 further comprises a pair of first force sensors 270 that are attached to opposing sides of the first beam 262, a pair of second force sensors 272 that are attached to opposing sides of the second beam 266, and an AE sensor 274 attached to the first bar 264. The force sensors 270 and 272 and the AE sensor 274 are connected to the interface circuit 224 of the computer 222.

Whether the slider 230 will contact the disk 212 when it separates from the ramp 216 during the loading process is dependent on the ramp design, air-bearing surface design, disk run-out and other factors. The first force sensors 270 are used to measure the friction force between the slider 230 and disk 212 once there is the slider-disk interaction. The second force sensors 272 are used to measure the loading force that the loading beam 234 exerts on the ramp 216 or the disk 212. The AE sensor 274 is used to monitor the HGA-ramp interaction and slider-disk interaction during the HGA-ramp contact period and HGA-ramp separation period, respectively.

The sixth embodiment provides an apparatus and method for monitoring the load/unload process of the combination of the HGA, disk and ramp. A ramp strain arm and a HGA strain arm are used for monitoring the whole load/unload process. The ramp strain arm on which the ramp is mounted includes force sensors that can measure the friction force between the HGA and ramp as well as the air-bearing force during the load/unload process. The HGA strain arm on which the HGA is mounted includes force sensors and an AE sensor that measure the friction force between the slider and disk and monitor the slider-disk interaction. The signals from the ramp strain arm and HGA strain arm are input to a computer through an interface circuit for recording and analysis in order to evaluate the performance of the combination of HGA, disk and ramp.

Accordingly, the invention affords a method and apparatus for monitoring load/unload testing by monitoring the suspension-ramp interaction and/or slider-disk interaction. The suspension-ramp interaction can be monitored through the friction force and AE signal from the force sensors and AE sensor that are installed on the ramp strain arm. The slider-disk interaction can be monitored through the friction force and AE signal from the force sensors and AE that are installed on the HGA strain arm.

It should be appreciated that the scope of this invention is not limited to the particular embodiments described above.

What is claimed is:

1. An apparatus for monitoring a load/unload process in a disk, a ramp and a head-gimbal-assembly (HGA), comprising:
   a ramp strain arm comprising a deformable member and a force sensing device provided on said deformable member, said ramp being mounted on said deformable member;
   an actuator assembly, the HGA being mounted on the actuator assembly, the actuator assembly controlling movement of the HGA to and from a loaded position on the ramp; and
   a controller in communication with the force sensing device to receive signals therefrom representative of the force on the ramp from the HGA.

2. An apparatus according to claim 1, wherein said force sensing device comprises first force sensors arranged to measure the friction force between the HGA and the ramp, and second force sensors arranged to measure the force which acts on the ramp along a direction perpendicular to the disk's surface.

3. The apparatus according to claim 2, wherein the force sensing device further comprises an AE sensor arranged to monitor the interaction force between the HGA, the disk and the ramp.

4. The apparatus according to claim 1, wherein said force sensing device comprises force sensors arranged to measure the friction force between the HGA and the ramp.

5. The apparatus according to claim 4, wherein the force sensing device further comprises an AE sensor arranged to monitor the interaction force between the HGA, the disk and the ramp.

6. The apparatus according to claim 1, wherein said force sensing device comprises force sensors arranged to measure the force which acts on the ramp along a direction perpendicular to the disk's surface.

7. The apparatus according to claim 6, wherein the force sensing device further comprises an AE sensor arranged to monitor the interaction force between the HGA, the disk and the ramp.

8. The apparatus according to claim 1, wherein said controller is arranged to control operation of a motor that revolves the disk.

9. The apparatus according to claim 1, wherein said controller is arranged to control operation of the actuator assembly for moving the HGA.

10. An apparatus for monitoring a load/unload process in at least one disk, a plurality of ramps and a head-stack-assembly comprising a plurality of head-gimbal-assemblies (HGAs), comprising:
    a plurality of ramp strain arms, each comprising a deformable member and a force sensing device provided on said deformable member, each ramp strain arm having a ramp mounted on its deformable member;
    an actuator assembly, the HGA being mounted on the actuator assembly, the actuator assembly controlling movement of the HGAs to and from a loaded position on the ramps; and
    a controller in communication with the force sensing device to receive signals therefrom representative of the force on the corresponding ramp from the corresponding HGA.

11. An apparatus according to claim 10, wherein said force sensing device of each ramp strain arm comprises first force sensors arranged to measure the friction force between the corresponding HGA and the corresponding ramp, and second force sensors arranged to measure the force which acts on the corresponding ramp along a direction perpendicular to the disk's surface.

12. The apparatus according to claim 11, wherein the force sensing device further comprises an AE sensor arranged to monitor the interaction force between the corresponding HGA, disk and ramp.

13. An apparatus according to claim 10, wherein said force sensing device of each ramp strain arm comprises force sensors arranged to measure the friction force between the corresponding HGA and the corresponding ramp.

14. The apparatus according to claim 13, wherein the force sensing device further comprises an AE sensor arranged to monitor the interaction force between the corresponding HGA, disk and ramp.

15. An apparatus according to claim 10, wherein said force sensing device of each ramp strain arm comprises force sensors arranged to measure the force which acts on the corresponding ramp along a direction perpendicular to the disk's surface.

16. The apparatus according to claim 15, wherein the force sensing device further comprises an AE sensor arranged to monitor the interaction force between the corresponding HGA, disk and ramp.

17. The apparatus according to claim 10, wherein said controller is arranged to control operation of a motor that revolves the disk.

18. The apparatus according to claim 10, wherein said controller is arranged to control operation of the actuator assembly for moving the HGA.

19. A ramp strain arm for monitoring a load/unload process in a disk, a ramp and a head-gimbal-assembly (HGA), comprising a deformable member and force sensing device provided on said deformable member, said ramp being mounted on said deformable member; whereby said force sensing device produce signals representative of the force on the ramp from the HGA.

20. A ramp strain arm according to claim 19, wherein said force sensing device comprises first force sensors arranged to measure the friction force between the HGA and the ramp, and second force sensors arranged to measure the force which acts on the ramp along a direction perpendicular to the disk's surface.

21. A ramp strain arm according to claim 20, wherein the force sensing device further comprises an AE sensor arranged to monitor the interaction force between the HGA, the disk and the ramp.

22. A ramp strain arm according to claim 20, wherein the force sensors comprise strain gauges.

23. A ramp strain arm according to claim 20, wherein the force sensors comprise piezo-electrical strain sensor.

24. A ramp strain arm according to claim 19, wherein said force sensing device comprises force sensors arranged to measure the friction force between the HGA and the ramp.

25. A ramp strain arm according to claim 24, wherein the force sensing device further comprises an AE sensor arranged to monitor the interaction force between the HGA, the disk and the ramp.

26. A ramp strain arm according to claim 24, wherein the force sensors comprise strain gauges.

27. A ramp strain arm according to claim 24, wherein the force sensors comprise piezo-electrical strain sensor.

28. A ramp strain arm according to claim 19, wherein said force sensing device of comprises force sensors arranged to measure the force which acts on the ramp along a direction perpendicular to the disk's surface.

29. A ramp strain arm according to claim 28, wherein the force sensing device further comprises an AE sensor arranged to monitor the interaction force between the HGA, the disk and the ramp.

30. A ramp strain arm according to claim 28, wherein the force sensors comprise strain gauges.

31. A ramp strain arm according to claim 28, wherein the force sensors comprise piezo-electrical strain sensor.

32. A method for monitoring the performance and/or the load/unload process of the combination of a HGA, disk and ramp comprising the steps of:

provinding a mechanism for supporting said disk for rotation about a central axis extending perpendicular to the substrate plane of disk;

providing a head-disk assembly comprising a slider carrying a read/write element and having an air-bearing surface, suspension and ramp rider;

providing a ramp strain arm having a deformable member and force sensors provided on said deformable member;

mounting the ramp on the deformable member, and recording signals from the force sensors.

33. The method according to claim 32, further comprising the steps of:

providing a HGA strain arm comprising a deformable member, force sensors provided on said deformable member and an AE sensor;

mounting said HGA on said deformable member; and recording signals from the force sensors and the AE sensor.

* * * * *